Oct. 14, 1924.  
C. J. HAZELTON  
HOSE SUPPORTER  
Filed June 20, 1923  
1,511,993
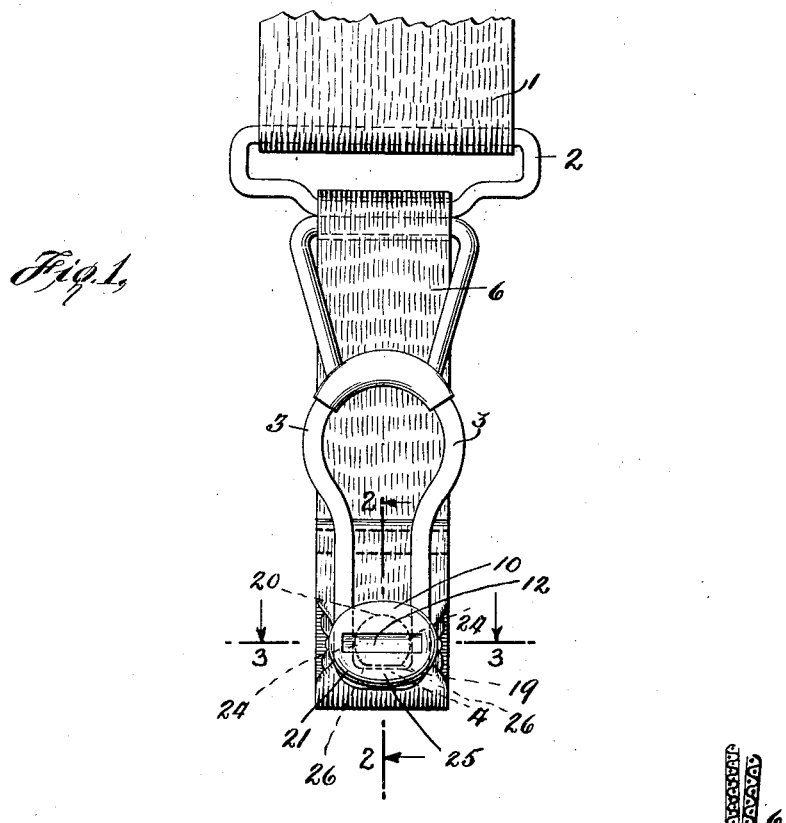
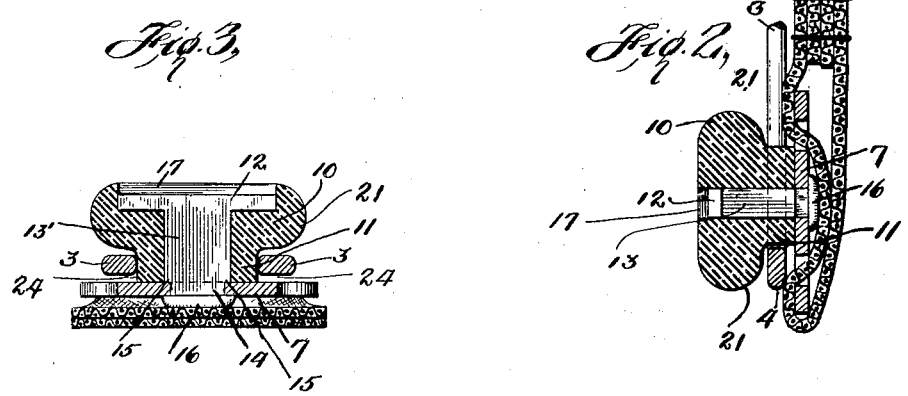

Patented Oct. 14, 1924.

1,511,993

UNITED STATES PATENT OFFICE.

CARL J. HAZELTON, OF WORCESTER, MASSACHUSETTS, ASSIGNOR TO AMERICAN NARROW FABRIC COMPANY, OF WORCESTER, MASSACHUSETTS, A CORPORATION OF MASSACHUSETTS.

HOSE SUPPORTER.

Application filed June 20, 1923. Serial No. 646,614.

*To all whom it may concern:*

Be it known that I, CARL J. HAZELTON, a citizen of the United States, and a resident of Worcester, in the county of Worcester and State of Massachusetts, have invented certain new and useful Improvements in Hose Supporters, of which the following is a specification.

My invention relates to an improvement in hose supporters and one of the objects thereof is the provision of an improved form of fastening means for securing the rubber collet or button constituting part of the hose supporter upon its supporting base plate to prevent turning of the collet on the base plate and accidental removal of the collet.

A further object of the invention is to hold the collet in place by a rivet or stud which is of such a character that collets of a softer quality of rubber than heretofore employed may be used.

A further object of the invention is the provision of a securing stud or rivet provided with a head extending beyond the shank of the collet and overlying the side arms of the supporter holding loop thereby reinforcing or providing a solid backing above that portion of the collet head which directly overlies the side arms of the loop to resist the strain necessarily present when the hose supporter is in use. This construction positively prevents the collet from becoming dislodged and the loop from becoming disengaged from the collet head.

Broadly my invention is realized by providing a rubber collet held in place on a support by a single rivet or stud having a head which overlies the side arms of the supporter holding loop. Specifically I attach a collet, having a non-circular head lying transversely of the supporter, to a base plate by a single rivet or stud passing entirely through the collet and having a flat shank the sides of which extend transversely of the supporter, this stud being provided with an elongated head extending lengthwise of the collet head and hence transversely of the supporter and overlying the side arms of the holding loop when the loop is in operative position relatively to said collet. The head of the securing stud or rivet lies in a similarly shaped depression or groove in the collet head thereby preventing accidental removal of the collet as well as assisting the flat shank of the stud in preventing turning of the collet on the stud.

As I have already pointed out if the head of the stud overlies the side arms of the loop when the loop is in operative or clamping position a solid backing is provided for that portion of the collet head immediately above the arms of the holding loop. This is a material advantage inasmuch as it not only prevents dislodgment of the collet from its base plate but it permits of softer rubber to be used than heretofore employed thereby providing a structure which will yield when the supporter is in use to reduce the strain on the hose fabric very materially.

It will be understood that the solid backing referred to and all of the advantages thereof may be realized whether the head of the collet is circular or non-circular as long as the head extends beyond the side arms of the holding loop and consequently the present invention is not to be limited to collets having non-circular heads nor to studs having heads which are elongated. It is to be understood also that the solid backing will be provided even if the groove or depression aforesaid in the head of the collet be omitted but it will be obvious that if this groove or depression be employed cooperation of the same with the head of the securing rivet or stud will assist the flat shank of the stud in preventing turning of the collet on the rivet.

In the accompanying drawings,—

Fig. 1 shows my improved hose supporter in plan with the supporter holding loop in operative position relatively to the collet;

Fig. 2 is a section on the line 2—2 of Fig. 1; and

Fig. 3 is a section on the line 3—3 of Fig. 1.

Referring to the drawings in detail, 1 designates a supporting member which is usually of elastic attached to a metal loop 2 in any suitable manner. Pivotally attached to this metal loop is a supporter holding loop comprising side arms 3 and a substantially straight transverse bar 4. The side arms are substantially parallel to each other for a short distance above the straight transverse bar 4 and thereafter diverge so as to provide an enlarged loop through which the head of the supporter button is adapted to be inserted when the supporter is applied to a hose. 6 designates a fabric tab supporting a base plate 7. On this base plate I mount a rubber button or collet comprising a head 10 and shank 11. The head of this button has been illustrated as elongated or oval in plan, the collet being disposed on the base plate so that the long axis of the head lies transversely of the supporter and of the supporter holding loop. I want it understood however that the present invention is not to be limited to a collet having a head of this particular shape inasmuch as the collet head may be round or of some other shape if desired as will be explained hereinafter in more detail.

The collet is preferably composed of relatively soft rubber and is secured on the base plate 7 by a single stud or rivet passing entirely through the collet and comprising a head 12 and flat shank 13 preferably of the same thickness and lying in the same plane the flat sides 13' of the shank extending transversely of the supporter. Adjacent the lower end of the shank I provide a reduced portion 14 to provide shoulders 15 on the shank which when the parts are assembled engage the face of the base plate 7, the reduced portion 14 of the shank passing through the base plate and being riveted over on the back thereof as indicated at 16. The head 10 of the collet is provided with a groove or depression 17 for receiving the head 12 of the holding rivet or stud and this groove or depression is elongated to conform to the shape of the elongated head 12 of the rivet or stud which it receives.

The shank 11 of the collet as indicated in dotted lines in Fig. 1 is segmental in cross-section providing a straight bottom surface 19 and a curved or convex portion 20. The shank is smaller in diameter than the head 10 of the collet to provide an overhang or flange 21 which receives the side arms 3 and transverse bar 4 of the supporter holding loop thereby preventing accidental disengagement of the holding loop from the collet. The head 12 of the securing stud or rivet extends beyond the curved sides 24 of the collet shank sufficiently to overlie the side arms 3 of the supporter holding loop when the latter is in operative position thereby providing a solid backing above that portion of the collet head immediately above the side arms of the holding loop to positively prevent the strain on the collet necessarily present when the hose supporter is in use from dislodging the collet and preventing the loop itself from becoming disengaged from the collet head.

As above pointed out the single holding rivet or stud for securing the collet to its base plate passes entirely through the collet and as indicated in Fig. 3, I prefer to sink the top of the head 12 of the holding rivet slightly below the top of the collet head to engage the depression or groove 17 and thereby provide additional means for preventing the collet from turning on the rivet or stud. Preferably I also slightly round the corners 26 where the straight bottom surface 19 of the collet shank meets the convex or curved portion 20 so as to eliminate any sharp corners on the collet shank which might possibly injure the hose fabric.

It will be seen from the foregoing that I have provided a hose supporter structure wherein the supporter collet or button is held in place on a base plate by a single rivet or stud passing entirely through the collet or button, the head of this rivet or stud overlying the side arms of the supporter loop to provide a solid backing for that portion of the collet head lying immediately above the loop when the supporter is in operation.

It will be seen also that by providing a non-circular head for the rivet or stud and having the same engage a non-circular groove in the head of the collet, I provide a structure which in conjunction with the flat shank of the stud effectively prevents turning of the collet on the stud and its accidental removal therefrom.

As above pointed out my improved construction permits me to employ softer rubber than heretofore used in the construction of the collet. This is of material advantage as it provides a yielding structure which will relieve undue strain on the hose fabric.

While I have illustrated and described a detailed construction embodying my improvements it is to be understood that I am not to be limited to the exact details described inasmuch as changes may be made therein within the purview of this invention.

I claim—

1. In a hose supporter the combination of a collet, a base plate, a stud for securing the collet to the base plate, said stud passing entirely through the collet and base plate and being provided with a head extending beyond the sides of the shank of the collet.

2. In a hose supporter the combination of a holding loop, a collet cooperating therewith, a base plate or support for said collet and a stud for securing said collet to said base plate said stud passing entirely through the collet and base plate and having a head overlying the side arms of said loop.

3. In a hose supporter the combination of a holding loop, a collet cooperating therewith and provided with a head, a base plate and means for securing said collet to the base plate, said securing means being provided with a head overlying the side arms of said loop and lying in and cooperating with a depression or groove in the surface of the head of said collet.

4. In a hose supporter the combination of a holding loop, a collet cooperating therewith and provided with a shank and with an elongated head extending transversely of said loop, the sides of said shank cooperating with the side arms of the loop, a support for the collet and means for securing said collet to its support, said securing means being provided with an elongated head extending lengthwise of said collet and overlying the side arms of said loop when the loop is in operative position relatively to the sides of the shank of said collet.

5. In a hose supporter the combination of a holding loop comprising side arms and a lower substantially straight transverse bar, a collet cooperating with said loop, said collet being provided with a head having a depression or groove therein extending transversely of said loop and with a shank having a flat surface or face cooperating with the transverse bar of said loop, a base plate, a stud for securing the collet to said base plate, said stud having an elongated head overlying the side arms of said loop and lying in and cooperating with said depression or groove in the head of said collet.

6. In a hose supporter the combination of a holding loop having a straight transverse bar, a collet cooperating therewith, a base plate, a stud for securing the collet to the base plate, said collet comprising a shank having a flat face or surface adapted to cooperate with said transverse bar, said stud having a flat shank the flat sides of which extend transversely of the supporter and having an elongated head overlying the side arms of the supporter loop.

7. In a hose supporter the combination of a collet, a base plate, a single stud passing entirely through said collet for securing the collet to the base plate, said stud having a flat shank the flat faces of which extend transversely of the supporter and an elongated head for the stud the long sides of which lie in the plane of the flat faces of the shank, said head lying in and cooperating with a correspondingly shaped groove in the head of the collet to prevent turning of the collet on the stud.

This specification signed this 18th day of June, 1923.

CARL J. HAZELTON.